United States Patent
Alastalo et al.

(10) Patent No.: US 8,557,920 B2
(45) Date of Patent: *Oct. 15, 2013

(54) HIGH MELT FLOW POLYMER OF IMPROVED DURABILITY FOR PIPE APPLICATIONS

(75) Inventors: Kauno Alastalo, Porvoo (FI); Carl-Gustaf Ek, Frölunda (SE); Bo Malm, Espoo (FI); Ulf Torgersen, Ytterby (SE); Olli Tuominen, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 949 days.

This patent is subject to a terminal disclaimer.

(21) Appl. No.: 11/914,886

(22) PCT Filed: May 11, 2006

(86) PCT No.: PCT/EP2006/004445
§ 371 (c)(1),
(2), (4) Date: Apr. 8, 2008

(87) PCT Pub. No.: WO2006/122703
PCT Pub. Date: Nov. 23, 2006

(65) Prior Publication Data
US 2009/0131586 A1    May 21, 2009

(30) Foreign Application Priority Data
May 20, 2005  (EP) ..................... 05010975

(51) Int. Cl.
C08F 10/06  (2006.01)
C08F 110/06  (2006.01)
C08F 210/06  (2006.01)

(52) U.S. Cl.
USPC ............. 525/193; 525/240; 525/52; 525/321; 525/323; 525/285; 525/324; 525/314; 525/315; 525/247; 525/268; 525/201; 525/79; 525/348; 525/351; 525/73; 502/132; 502/134; 502/153

(58) Field of Classification Search
USPC ........... 525/193, 240, 52, 332, 323, 285, 321, 525/324, 314, 315, 247, 268; 526/201, 79, 526/348, 351, 73, 125; 502/132, 134, 153
See application file for complete search history.

(56) References Cited

U.S. PATENT DOCUMENTS

| | | | |
|---|---|---|---|
| 5,362,782 A * | 11/1994 | McCullough et al. | 524/108 |
| 6,221,974 B1 * | 4/2001 | Harkonen et al. | 526/124.5 |
| 6,503,993 B1 * | 1/2003 | Huovinen et al. | 526/348.1 |
| 6,770,714 B2 * | 8/2004 | Ommundsen et al. | 525/191 |
| 2004/0116607 A1 * | 6/2004 | Malm et al. | 525/240 |

FOREIGN PATENT DOCUMENTS

| | | |
|---|---|---|
| EP | 0 591 224 | 2/1998 |
| EP | 0 894 103 | 7/2002 |
| EP | 0 791 609 | 7/2003 |
| WO | WO 97/13790 | 4/1997 |
| WO | WO 99/24479 | 5/1999 |
| WO | WO 99/24501 | 5/1999 |
| WO | WO 99/35430 | 7/1999 |
| WO | WO 03/037981 | 5/2003 |

OTHER PUBLICATIONS

International Search Report for International Application No. PCT/EP2006/004445.
Encyclopedia of Polymer Science and Engineering, second edition, vol. 6, pp. 545-558.

* cited by examiner

Primary Examiner — Robert C Boyle
(74) Attorney, Agent, or Firm — Fay Sharpe LLP

(57) ABSTRACT

The present invention relates to a polymer composition, comprising (i) a polypropylene homopolymer, (ii) a polypropylene random copolymer, prepared by copolymerization of propylene with an olefin comonomer and having an amount of olefin comonomer units of 0.2 to 5 wt %, and (iii) an elastomeric copolymer of propylene and at least one olefin comonomer, the polymer composition having a tensile modulus, determined according to ISO 527-2/1 B at 1 mm/min. and 230 C, of at least 1200 MPa.

19 Claims, No Drawings

HIGH MELT FLOW POLYMER OF IMPROVED DURABILITY FOR PIPE APPLICATIONS

The present invention relates to a polymer composition having improved durability and stiffness while still keeping processability on a high level. Furthermore, it relates to a process for preparing such a polymer composition and to pipes made therefrom.

Pipes made of polymeric material are frequently used for various purposes such as fluid transport, i.e. transport of liquids and gases. The fluid may be pressurized, e.g. when transporting natural gas or tap water, or non-pressurized, e.g. when transporting sewage (waste-water), drainage, for storm water applications or indoor sewage (soil and waste discharge). Moreover, the transported fluid may have varying temperature, usually within the range of 0° C. to 50° C. Pressureless (non-pressure) pipes may also be used for cable and pipe protection and for culverts (e.g. road and rail).

Polypropylene-based polymers have many characteristics which make them suitable for applications like pipes, fittings, moulded articles, foams etc. Polypropylene as pipe material is mainly used in non-pressure applications (pipes and fittings) and profiles. Polypropylene is also used for pressure pipes, mainly for hot water and industrial pipes. The good properties at high temperature of polypropylene compared to other polyolefins are often utilized for pipe applications. All three main types of propylene polymers, i.e. homopolymers, random copolymers and block copolymers (i.e. rubber-like elastomeric copolymers) are used.

In general, polypropylene-based materials to be chosen for pipe applications should result in products of high stiffness as well as high durability while still maintaining good processability. However, these properties are interrelated to each other and very often behave in a conflicting manner, i.e. improving a specific property can only be accomplished on the expense of another property.

Stiffness can be improved by increasing the amount of homopolymer within the composition. As a consequence, the material becomes more brittle, thereby resulting in poor impact properties. Furthermore, high brittleness is usually accompanied by lower resistance to slow crack growth, thereby having a detrimental effect on durability.

Pipes are normally produced by extrusion or, to a smaller extent, by injection moulding. Thus, to improve processability the polymeric melt should be of low viscosity. However, by using such low viscosity material, the resulting durability is usually not sufficient for meeting the requirements as defined in international standards like EN 1852, prEN13476. Normally, melt flow rate values of polymers for non-pressure pipe applications are kept at a low level to fulfil standard requirements on durability.

Furthermore, non-pressure pipes need to have sufficient ring stiffness to withstand the soil pressure. High stiffness is indicated by high values of tensile modulus. However, as explained above, an increase in tensile modulus and, consequently, in stiffness of the pipe might have a detrimental effect on impact properties and/or slow crack growth resistance.

In EP 0894103, a polymer composition is provided comprising a polypropylene homopolymer and a polypropylene random copolymer. Optionally, a rubbery copolymer can be added to result in a so-called impact modified polymer. For these impact modified polymers, melt flow rate $MFR_{2.16\ kg/230°\ C.}$ is kept at a low level. Furthermore, a tensile modulus is chosen which does not exceed 1100 MPa.

Considering the problems discussed above, it is an object of the present invention to provide a polypropylene-based composition from which pipes of high stiffness as well as high durability can be prepared while still maintaining good processability of the polymeric melt. A further object is to provide a process for the preparation of such a composition and to provide a pipe of high stiffness and durability and a low amount of defects due to the improved processability of the polymer.

These objects are solved by providing a polymer composition, comprising
(i) a polypropylene homopolymer,
(ii) a polypropylene random copolymer, prepared by copolymerization of propylene with an olefin comonomer and having an amount of olefin comonomer units of 0.2 to 5.0 wt %, and
(iii) an elastomeric copolymer of propylene and at least one olefin comonomer,
the polymer composition having a tensile modulus, determined according to ISO 527-2/1 B at 1 mm/min and 23° C., of at least 1200 MPa.

Within the context of the present invention, a polypropylene homopolymer is defined to be a polymer preferably consisting of more than 99.8 wt %, more preferably more than 99.9 wt %, even more preferably more than 99.99 wt % of propylene units.

If units other than propylene units are present, these originate preferably from an olefin such as ethylene.

The polypropylene homopolymer can be unimodal or multimodal.

The expression "multimodal" used herein refers to the modality of the polymer, i.e. the form of its molecular weight distribution curve, which is the graph of the molecular weight fraction as a function of its molecular weight. As will be explained below, the polymer components of the present invention can be produced in a sequential step process, using reactors in serial configuration and operating at different reaction conditions. As a consequence, each fraction prepared in a specific reactor will have its own molecular weight distribution. When the molecular weight distribution curves from these fractions are superimposed to obtain the molecular weight distribution curve of the final polymer, that curve may show two or more maxima or at least be distinctly broadened when compared with curves for the individual fractions. Such a polymer, produced in two or more serial steps, is called bimodal or multimodal, depending on the number of steps.

In a preferred embodiment, the polypropylene homopolymer fraction has a melt flow rate $MFR_{2.16\ kg/230°\ C.}$ of less than 20 g/10 min. In general, melt flow rate is related to flowability of the polymeric melt at a specific temperature when subjected to a specific load. High melt flow rate values indicate a polymeric melt of low viscosity, and vice versa.

As will be explained below in greater detail, the polypropylene homopolymer can be prepared in a first step, i.e. before preparing the polypropylene random copolymer and the elastomeric copolymer, or at a later stage. If prepared in a later stage, the homopolymer can be reactor-blended with a component already prepared before, thereby resulting in a polymeric mixture from which only a total melt flow rate can be determined but not the melt flow rate of each component within the blend. However, even if obtained as a reactor blend, the $MFR_{2.16\ kg/230°\ C.}$ of the polypropylene homopolymer refers to a pure homopolymer fraction. In other words, it is the melt flow rate value of the polypropylene homopolymer that would have been obtained if polymerized without the presence of further components.

In other preferred embodiments, the polypropylene homopolymer fraction has a melt flow rate $MFR_{2.16\ kg/230°\ C.}$ of less than 10 g/10 min., less than 5 g/10 min., or even less than 2 g/10 min.

A further essential feature of the polymer composition of the present invention is the presence of a polypropylene random copolymer, prepared by copolymerization of propylene with an olefin comonomer and having an amount of olefin comonomer units of 0.2 to 5.0 wt %, based on the weight of the polypropylene random copolymer.

As already indicated above, a random copolymer is one of the three main types of polypropylene. In general, a polypropylene random copolymer is obtained when propylene is polymerized with at least one comonomer so as to result in a random or statistical distribution of the comonomer within the polymer chain. The amount and type of comonomer has a significant influence on a number of properties like crystallization behaviour, stiffness, melting point or flowability of the polymer melt. To solve the objects of the present invention, in particular to provide an improved balance between stiffness, durability and melt flow behaviour, it is necessary to keep the amount of comonomer units of the polypropylene random copolymer within the range given above.

Preferably, the amount of comonomer units within the polypropylene random copolymer is from 0.5 wt % to 4.0 wt %. In other preferred embodiments, the amount is from 0.5 wt % to 3.0 wt %, or from 0.8 wt % to 3.0 wt %.

Preferably, the polypropylene random copolymer has a weight average molecular weight which is higher than the weight average molecular weight of the polypropylene homopolymer. Since molecular weight and melt flow rate are in a reciprocal relation to each other, it is also preferred that the polypropylene random copolymer has a $MFR_{2.16\ kg/230°\ C.}$ which is lower than the $MFR_{2.16\ kg/230°\ C.}$ of the polypropylene homopolymer.

The olefin comonomer is preferably selected from ethylene, $C_4$ to $C_{10}$ alpha-olefins such as 1-butene, 1-hexene or 1-octene, or mixtures thereof. Ethylene is the preferred comonomer.

When ethylene is used as the olefin comonomer, its amount within the polypropylene random copolymer is preferably within the range of 0.2 to 5.0 wt %. In other preferred embodiments, its amount is within the range of 0.5 wt % to 4.0 wt %, 0.5 wt % to 3.0 wt %, or 0.8 wt % to 3.0 wt %.

Even at a very low level of comonomer within the polypropylene random copolymer, the polymer composition of the present invention is still successful in simultaneously improving durability and processability at a high stiffness level.

When based on the combined weight of the polypropylene homopolymer and the polypropylene random copolymer, the amount of ethylene comonomer units within the random copolymer is preferably from 0.1 wt % to 3.0 wt %. In other preferred embodiments, the amount is preferably from 0.1 wt % to 2.0 wt %, or from 0.5 wt % to 1.5 wt %.

In a preferred embodiment, the polypropylene homopolymer and the polypropylene random copolymer are prepared in the same reactor or in two or more reactors connected to each other in serial configuration, as will be explained below in greater detail. As a consequence, both components are reactor-blended during polymerization and result in a polypropylene-based matrix.

Preferably, the polypropylene-based matrix has a melt flow rate $MFR_{2.16\ kg/230°\ C.}$ of 0.1 to 10.0 g/10 min. In other preferred embodiments, the matrix has a $MFR_{2.16\ kg/230°\ C.}$ of 0.2 to 5.0 g/10 min, 0.2 to 3.5 g/10 min., 0.2 to 2.0 g/10 min, 0.2 to 1.5 g/10 min, or 0.2 to 1.0 g/10 min.

The melting point of the matrix is preferably above 157° C., above 158° C., or above 159° C.

As already indicated above, the matrix preferably has an amount of ethylene comonomer units of 0.1 wt % to 3.0 wt %, based on the weight of the matrix. In other preferred embodiments, the amount is preferably from 0.1 wt % to 2.0 wt %, or from 0.5 wt % to 1.5 wt %.

A further essential feature of the polymer composition of the present invention is the presence of an elastomeric copolymer of propylene and at least one olefin comonomer. The presence of such an elastomeric propylene copolymer improves impact performance of the final polymer. The conditions for the copolymerization are within the limits of conventional conditions for ethylene-propylene rubber (EPM) production. Typical conditions are disclosed e.g. in Encyclopedia of Polymer Science and Engineering, second edition, vol. 6, p. 545-558. An elastomeric product is obtained when the comonomer content of the polymer is within a certain range.

Suitable olefin comonomers to be copolymerized with propylene can be selected from ethylene, $C_4$ to $C_{10}$ alpha-olefins such as 1-butene, 1-hexene or 1-octene, or mixtures thereof. Preferably, ethylene is used.

Preferably, the elastomeric copolymer contains olefin comonomer units in an amount of 10 to 70 wt %, more preferably 20 to 50 wt %, based on the weight of the elastomeric copolymer.

When ethylene is used as an olefin comonomer, the elastomeric copolymer preferably contains ethylene units in an amount of 10 to 70 wt %, based on the weight of the elastomeric copolymer. In other preferred embodiments, the amount of ethylene units within the elastomeric copolymer is from 20 wt % to 50 wt %, from 25 wt % to 40 wt %, or from 30 wt % to 40 wt %.

Preferably, the elastomeric copolymer has an intrinsic viscosity of 2 to 6 dl/g, measured in tetraline. More preferably, intrinsic viscosity is within the range of 3 to 5 dl/g. Intrinsic viscosity is related to the molecular weight, i.e. intrinsic viscosity increases with increasing molecular weight. It is measured as follows: The relative viscosity of a polymer sample dissolved in tetraline (1,2,3,4-tetrahydronaphthalene) is measured by using a Ubbelohde viscometer when the concentration of the polymer sample is 0.1 g/100 ml. The intrinsic viscosity is the value calculated with the Huggins equation.

As indicated above, the presence of an elastomeric ethylene-propylene copolymer improves impact properties as determined e.g. by measurement of Charpy notched impact strength. However, if the amount of elastomeric copolymer within the final polymer composition is too high, this might have a detrimental effect on other properties like stiffness or processability.

Preferably, the polymer composition of the present invention comprises an amount of elastomeric copolymer within the range of 5 wt % to 15 wt %, more preferably 7 wt % to 15 wt %, based on the weight of the polymer composition.

According to a further essential feature, the polymer composition of the present invention needs to have a tensile modulus of at least 1200 MPa, thereby resulting in a material of high stiffness. Tensile modulus is determined according to ISO 527-2/1 B at 1 mm/min. and 23° C. A tensile modulus of the final polymer composition of at least 1200 MPa in combination with the specific components (i), (ii) and (iii) enables to have high stiffness while simultaneously improving durability and processability.

Preferably, the polymer composition of the present invention has a tensile modulus of at least 1300 MPa, at least 1350

MPa, at least 1400 MPa, at least 1450 MPa, at least 1500 MPa, at least 1550 MPa or at least 1600 MPa.

A property related to durability of a polymeric material is the resistance to slow crack growth. This property can be tested according to ISO 1167, wherein the resistance of a pipe made of the polymer composition to a circumferential (hoop) stress of 4.2 MPa at a constant temperature of 80° C. is determined. The time to failure of the pipe is recorded.

As discussed above, melt flow rate and durability are contradicting properties. To have an improved balance between these properties, the polymer composition of the present invention preferably has a melt flow rate $MFR_{2.16\ kg/230°\ C.}$ and a resistance to slow crack growth which satisfy the following relationship:

$t \geq 300 - 200 * MFR_{2.16\ kg/230°\ C.}$ for $0.1$ g/10 min $\leq MFR_{2.16\ kg/230°\ C.} < 1.0$ g/10 min, $t \geq 105 - 5 * MFR_{2.16\ kg/230°\ C.}$ for $1.0$ g/10 min $\leq MFR_{2.16\ kg/230°\ C.} < 10.0$ g/10 min, $t \geq 55$ for $MFR_{2.16\ kg/230°\ C.} \geq 10.0$ g/10 min, wherein t in hours is the time of failure in the slow crack growth test performed at 80° C. and 4.2 MPa according to ISO 1167.

In a further preferred embodiment, the polymer composition of the present invention has a melt flow rate $MFR_{2.16\ kg/230°\ C.}$ and a resistance to slow crack growth which satisfy the following relationship:

$t \geq 500 - 350 * MFR_{2.16\ kg/230°\ C.}$ for $0.1$ g/10 min $\leq MFR_{2.16\ kg/230°\ C.} < 1.0$ g/10 min, $t \geq 155 - 5 * MFR_{2.16\ kg/230°\ C.}$ for $1.0$ g/10 min $\leq MFR_{2.16\ kg/230°\ C.} < 10.0$ g/10 min, $t \geq 105$ for $MFR_{2.16\ kg/230°\ C.} \geq 10.0$ g/10 min, wherein t has the same meaning as indicated above.

Even more preferably, the polymer composition of the present invention has a melt flow rate $MFR_{2.16\ kg/230°\ C.}$ and a resistance to slow crack growth which satisfy the following relationship:

$t \geq 700 - 500 * MFR_{2.16\ kg/230°\ C.}$ for $0.1$ g/10 min $\leq MFR_{2.16\ kg/230°\ C.} < 1.0$ g/10 min, $t \geq 205 - 5 * MFR_{2.16\ kg/230°\ C.}$ for $1.0$ g/10 min $\leq MFR_{2.16\ kg/230°\ C.} < 10.0$ g/10 min, $t \geq 155$ for $MFR_{2.16\ kg/230°\ C.} \geq 10.0$ g/10 min, wherein t has the same meaning as indicated above.

To improve flowability, the polymer composition preferably has a melt flow rate $MFR_{2.16\ kg/230°\ C.}$ of at least $0.2$ g/10 min.

In a preferred embodiment, the melt flow rate $MFR_{2.16\ kg/230°\ C.}$ of the polymer composition is within the following range:

$0.2$ g/10 min $\leq MFR_{2.16\ kg/230°\ C.} < 10.0$ g/10 min, to have a better compromise between flowability of the polymeric melt and durability of the final polymer.

In other preferred embodiments, the melt flow rate $MFR_{2.16\ kg/230°\ C.}$ of the polymer composition is 0.2 to 8.0 g/10 min, 0.2 to 7.0 g/10 min. 0.2 to 6.0 g/10 min, 0.2 to 5.0 g/10 min, or 0.2 to 3.0 g/10 min.

The polymer composition of the present invention preferably has a Charpy impact strength (NIS) at −20° C. of at least $2.0$ kJ/m$^2$, more preferably at least $3.0$ kJ/m$^2$, even more preferably at least $4.0$ kJ/m$^2$, and most preferably at least $5.0$ kJ/m$^2$, measured according to ISO 179/1eA.

Furthermore, to optimize the balance between stiffness and impact behaviour at low temperature, the tensile modulus of the polymer composition is preferably chosen to be at least 1375 MPa whereas the Charpy impact strength at −20° C. is at least $3.0$ kJ/m$^2$. In other preferred embodiments, the following combinations of tensile modulus and Charpy impact strength are chosen: at least 1400 MPa and at least $3.5$ kJ/m$^2$, at least 1400 MPa and at least $4.0$ kJ/m$^2$, or at least 1450 MPa and at least $3.5$ kJ/m$^2$.

Preferably, the polymer composition has a polydispersion index PI of 2.5 to 6.0. In other preferred embodiments, PI of the matrix is within the range of 3.0 to 5.0 or 3.0 to 4.5. The polydispersion index PI is calculated according to the following equation:

$$PI = 10^5\ Pa/G_C$$

wherein $G_C$ in Pa is the cross over modulus at which $G' = G'' = G_C$, G' and G'' indicating the storage modulus and the loss modulus, respectively.

The rheology measurements have been done according to ISO 6421-10. Measurements were made at 220° C. and 200° C. Further details about G' and G'' and the measuring method are provided below in the examples.

In addition to the components discussed above, the polymer composition may comprise conventional adjuvants, such as additives, fillers and reinforcing agents.

As additives, the following can be mentioned: nucleating agents, process and heat stabilizers, pigments and other colouring agents including carbon black. Depending on the type of additive, these may be added in an amount of 0.01 to 5 wt %, based on the weight of the polymer composition.

In a preferred embodiment, the polymer composition includes 0.05 to 3 wt %, based on the weight of the polymer composition, of one or more alpha-nucleating agents such as talc, polymerized vinyl compounds such as polyvinyl cyclohexane, dibenzylidene sorbitol, sodium benzoate, and di(alkylbenzylidene)sorbitol. Except for talc, the alpha-nucleating agent is usually added in small amounts of 0.0001 to 1.0 wt %, more preferably 0.001 to 0.7 wt %. Since talc can act both as a nucleating agent and as a filler, it can be added in higher amounts. When added as a nucleating agent, talc is preferably added in an amount of 0.05 to 3.0 wt %, more preferably 0.1 to 2.0 wt %, based on the weight of the polymer composition. Further details about these nucleating agents can be found e.g. in WO 99/24479 and WO 99/24501.

According to the present invention, there is also provided a process for preparing the polymer composition discussed above. The process of the present invention comprises the following steps:
(i) preparing a polypropylene homopolymer,
(ii) copolymerization of propylene with an olefin comonomer to result in a polypropylene random copolymer, and
(iii) copolymerization of propylene with an olefin comonomer to result in an elastomeric copolymer,
wherein these steps can be carried out in any sequence.

However, it is preferred to either have the sequence (i)→(ii)→(iii) or the sequence (ii)→(i)→(iii).

Preferably, at least the process steps (i) and (ii), in any sequence, are carried out in at least one loop reactor and/or at least one gas phase reactor. According to another preferred embodiment, all process steps (i) to (iii) are carried out in at least one loop reactor and/or at least one gas phase reactor.

According to a preferred embodiment, the first reaction step is carried out in a loop reactor, this step optionally also comprising at least one gas phase reactor to which the product of the loop reactor is transferred to continue polymerization. Preferably, any reaction medium used and any non-reacted reagents are at least partly removed before transfer from the loop reactor to the gas phase reactor is performed.

For the present invention, conventional loop and gas phase reactors which are commonly known in the relevant technical field can be used.

If the polypropylene homopolymer is prepared first, reaction conditions are chosen so as to preferably have a $MFR_{2.16\ kg/230°\ C.}$ of less than 20 g/10 min for the homopolymer. By using a loop reactor and at least one gas phase reactor in serial configuration and working at different conditions, a multimodal (e.g. bimodal) polypropylene homopolymer can be obtained. However, within the context of the present invention, the polypropylene homopolymer can also be unimodal.

As an alternative, the polypropylene random copolymer is prepared first. Again, polymerization can be effected by using a loop reactor only or a loop reactor in serial configuration with at least one gas phase reactor, the latter configuration resulting in a multimodal (e.g. bimodal) polypropylene random copolymer.

The amount and feed rate of olefin comonomer fed into the reactor for copolymerization with propylene are such that the random copolymer has an amount of olefin comonomer units of 0.2 to 5.0 wt %, based on the weight of the random copolymer. Preferably, ethylene is used as the olefin comonomer.

In a preferred embodiment, the polypropylene homopolymer is prepared first in a loop reactor. Preferably, the homopolymer has a $MFR_{2.16\ kg/230°\ C.}$ of less than 20 g/10 min, more preferably less than 10 g/10 min. and even more preferably less than 5 g/10 min or less than 2 g/10 min. Subsequently, the polypropylene homopolymer is transferred to a first gas phase reactor wherein copolymerization of propylene with an olefin comonomer, preferably ethylene, to the polypropylene random copolymer is effected, thereby resulting in a reactor-blended polymeric mixture, i.e. a polypropylene-based matrix, having an amount of comonomer units of 0.1 wt % to 3.0 wt %, based on the weight of the matrix. In other preferred embodiments, the amount is preferably from 0.1 wt % to 2.0 wt %, or from 0.5 wt % to 1.5 wt %.

Preferably, a loop reactor for preparing a polypropylene homopolymer or random copolymer is operated at a temperature of 60° C. to 95° C. and a pressure of 4000 kPa to 8000 kPa. In a preferred embodiment, at least one loop reactor is operated under supercritical conditions. As an example, supercritical conditions can include a temperature of at least 92° C. and a pressure of at least 4600 kPa.

Preferably, a gas phase reactor for preparing a polypropylene homopolymer or random copolymer is operated at a temperature of 60° C. to 100° C. and a pressure of 1000 kPa to 4000 kPa.

To further improve the balance between stiffness, durability and processability of the polymer composition, a specific split between a first process step producing a first component and a second process step producing a second component can be chosen. The split indicates the weight ratio between different polymeric components prepared in different reaction steps. Preferably, the split between process step (i) and process step (ii), irrespective of their sequence, is from 80:20 to 20:80, more preferably from 70:30 to 30:70 and even more preferably from 40:60 to 60:40

As a catalyst for the preparation of the polypropylene homopolymer and/or the polypropylene random copolymer, any stereo-specific catalyst for propylene polymerization can be used, which is capable of catalyzing polymerization and copolymerization of propylene and comonomers at a pressure of 500-10000 kPa, in particular 2500-8000 kPa, and at a temperature of 40-110° C., in particular 60-110° C.

Preferably, the catalyst comprises a high-yield Ziegler-Natta type catalyst which can be used at high polymerization temperatures of 80° C. or more.

Generally, the Ziegler-Natta catalyst used in the present invention comprises a catalyst component, a cocatalyst component, an external donor, the catalyst component of the catalyst system primarily containing magnesium, titanium, halogen and an internal donor. Electron donors control the stereospecific properties and/or improve the activity of the catalyst system. A number of electron donors including ethers, esters, polysilanes, polysiloxanes, and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds, titanium trichloride and titanium tetrachloride being particularly preferred.

It is preferred to use catalysts which can withstand the high temperatures prevailing in the loop reactor. The conventional Ziegler-Natta catalysts for isotactic polymerization of propylene generally have an operating temperature limit of around 80° C., above which they either become deactivated or lose their stereo-selectivity. This low polymerization temperature may put a practical limit on the heat removal efficiency of the loop reactor.

One preferred catalyst to be used according to the invention is disclosed in EP 591 224 which discloses a method for preparing a procatalyst composition from magnesium dichloride, a titanium compound, a lower alcohol and an ester of phthalic acid containing at least five carbon atoms. According to EP 591 224, a trans-esterification reaction is carried out at an elevated temperature between the lower alcohol and the phthalic acid ester, whereby the ester groups from the lower alcohol and the phthalic ester change places.

Magnesium dichloride can be used as such or it can be combined with silica, e.g. by absorbing the silica with a solution or slurry containing magnesium dichloride. The lower alcohol used may preferably be methanol or ethanol, particularly ethanol.

The titanium compound used in the preparation of the procatalyst is preferably an organic or inorganic titanium compound, which is at the oxidation state of 3 or 4. Also other transition metal compounds, such as vanadium, zirconium, chromium, molybdenum and tungsten compounds can be mixed with the titanium compound. The titanium compound usually is a halide or oxyhalide, an organic metal halide, or a purely metal organic compound in which only organic ligands have been attached to the transition metal. Particularly preferred are the titanium halides, especially titanium tetrachloride.

The alkoxy group of the phthalic acid ester used comprises at least five carbon atoms, preferably at least eight carbon atoms. Thus, as the ester may be used e.g. propylhexyl phthalate, dioctyl phthalate, di-isodecyl phthalate and ditridecyl phthalate. The molar ratio of phthalic acid ester and magnesium halide is preferably about 0.2:1.

The transesterification can be carried out, e.g. by selecting a phthalic acid ester—a lower alcohol pair, which spontaneously or by the aid of a catalyst, which does not damage the procatalyst composition, transesterifies the catalyst at an elevated temperature. It is preferred to carry out the transesterification at a temperature which is 110-115° C., preferably 120-140° C.

In a preferred embodiment, the Ziegler-Natta catalyst system can be modified by polymerizing in the presence of the catalyst a vinyl compound of the formula

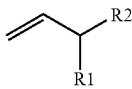

wherein $R_1$ and $R_2$ together form a 5 or 6-membered saturated, unsaturated or aromatic ring or independently represent an alkyl group comprising 1 to 4 carbon atoms, and the modified catalyst is used for the preparation of the polymer composition. Preferably, the vinyl compound is vinyl cyclohexane. Further details about this modification are provided in EP 1 028 985. The polymerized vinyl compound is acting as a nucleating agent for the polymer composition of the present invention and further supports reaching high stiffness but still good impact behaviour, in particular at low temperature.

Other nucleating agents that can be added to the polymer comprise talc, dibenzylidene sorbitol, sodium benzoate, di(alkylbenzylidene)sorbitol, or mixtures thereof. Within the context of the present invention, it is also possible to combine one of these nucleating agents with the vinyl nucleating system above. In a preferred embodiment, the polymerized vinyl compound is used in combination with talc.

The catalyst prepared by the method described above, either modified with the vinyl compound or not, is used together with an organometallic cocatalyst and with an external donor. Generally, the external donor has the formula

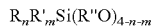

wherein
R and R' can be the same or different and represent a linear, branched or cyclic aliphatic, or aromatic group;
R" is methyl or ethyl;
n is an integer of 0 to 3;
m is an integer of 0 to 3; and
n+m is 1 to 3.

In particular, the external donor is selected from the group consisting of cyclohexyl methylmethoxy silane (CHMMS), dicyclopentyl dimethoxy silane (DCPDMS), diisopropyl dimethoxy silane, di-isobutyl dimethoxy silane, and di-t-butyl dimethoxy silane.

An organoaluminium compound is used as a cocatalyst. The organoaluminium compound is preferably selected from the group consisting of trialkyl aluminium, dialkyl aluminium chloride and alkyl aluminium sesquichloride.

According to the invention, such catalysts are typically introduced into the first reactor only. The components of the catalyst can be fed into the reactor separately or simultaneously or the components of the catalyst system can be precontacted prior to the reactor.

Such precontacting can also include a catalyst prepolymerization prior to feeding into the polymerization reactor proper. In the prepolymerization, the catalyst components are contacted for a short period with a monomer before feeding to the reactor.

As discussed above, in preferred embodiments the homopolymer and the random copolymer are prepared first, whereas the elastomeric copolymer is prepared in a final step. Preferably, the elastomeric copolymer is prepared in a gas phase reactor. Optionally, two or more gas phase reactors can be used. The one or more gas phase reactors for the preparation of the elastomer can be in serial configuration with the reactors used for the preparation of the homopolymer and random copolymer. When using such a reactor configuration, the elastomeric copolymer is produced in the presence of the homopolymer/random copolymer matrix and dispersed therein.

As an alternative, the elastomeric copolymer can be prepared separately and mixed with the homopolymer/random copolymer matrix at a later stage, e.g. by mechanical blending.

In general, the conditions for the preparation of the elastomeric copolymer are within the limits of conventional conditions for ethylene-propylene rubber (EPM) production. Typical conditions are disclosed e.g. in Encyclopedia of Polymer Science and Engineering, second edition, vol. 6, p. 545-558. An elastomeric product is obtained when the comonomer content of the polymer is within a certain range.

The catalytic system described above for the preparation of the polypropylene homopolymer and random copolymer can also be used for the preparation of the elastomeric copolymer.

To further improve the balance between stiffness, durability and processability of the polymer composition, a specific split between process steps (i) and (ii) on the one hand and process step (iii) on the other hand can be chosen. Preferably, the split between the process steps (i) and (ii) and the process step (iii) is from 95:5 to 60:40, more preferably from 90:10 to 75:25 and even more preferably from 90:10 to 80:20.

The present invention also provides a pipe and pipe fittings prepared from the polymer composition discussed above, e.g. by extrusion or injection moulding. The polymer composition can be used for pressure as well as non-pressure pipes. Preferably, it is used for non-pressure pipes. These pipes have high durability as indicated by high resistance to slow crack growth. Furthermore, they can be prepared at high line speed due to increased melt flow rate. Furthermore, the pipes show high stiffness.

The invention is now described in further detail by making reference to examples.

EXAMPLES

1. Measuring Methods (a) Melt Flow Rate
Melt flow rate was measured according to ISO 1133, either at 230° C. and 2.16 kg ($MFR_{2.16\,kg/230°\,C.}$) or at 230° C. and 10 kg ($MFR_{2.16\,kg/230°\,C.}$).
(b) Tensile Properties
Tensile properties were determined on samples prepared from compression-moulded plaques having a sample thickness of 4 mm.
Tensile modulus was determined according to ISO 527-2/1 B at 1 mm/min. and 23° C.
To determine stress at yield and strain at yield, a speed of 50 mm/min. was used.
(c) Resistance to Slow Crack Growth
Resistance to slow crack growth was determined according to ISO 1167. In this test, a specimen is exposed to constant circumferential (hoop) stress of 4.2 MPa at elevated temperature of 80° C. in water-in-water. The time in hours to failure is recorded.
The tests were performed on pipes produced on a conventional pipe extrusion equipment, the pipes having a diameter of 110 mm and a wall thickness of 5 mm.
(d) Notched Impact Strength
Notched impact strength was determined according to ISO 179/1eA on samples prepared from compression-moulded plaques.

(e) Amount of Comonomer Units

The amount of comonomer units was determined by FTIR, calibrated by NMR.

(f) Polydispersion Index PI

The polydispersion index PI is calculated according to the following equation:

$$PI = 10^5 \text{ Pa}/G_C$$

wherein $G_C$ in Pa is the cross over modulus at which $G'=G''=G_C$.

The rheology measurements have been made according to ISO 6421-10. Measurements were made at 220° C. and 200° C. G' and G" indicate storage modulus and loss modulus, respectively. Measurements were made on a Physica MCR 300 rheometer with a plate-plate fixture, plate diameter 25 mm, and a distance between the plates of 1.8 mm.

(g) SIST Measurements

Stepwise Isothermal Segregation Technique (SIST) fractionates the material according to the chain regularity (the average length of the isotactic PP sequences between the defects).

SIST analysis was performed on a Mettler DSC 821 e with aluminium crucible having a volume of 40 μm.

Sample weight 4-6 mg

Nitrogen flow 80 ml/min

SIST analysis was done with the following temperature program:

| | heating/cooling step | rate | isothermal/ annealing |
|---|---|---|---|
| $1^{st}$ melting | 25-225° C. | 10° C./min | 10 min at 225° C. |
| Crystallisation | 225-155° C. | 10° C./min | 120 min at 155° C. |
| step, annealing | 155-145° C. | 10° C./min | 120 min at 145° C. |
| | 145-135° C. | 10° C./min | 120 min at 135° C. |
| | 135-125° C. | 10° C./min | 120 min at 125° C. |
| | 125-115° C. | 10° C./min | 120 min at 115° C. |
| | 115-105° C. | 10° C./min | 120 min at 105° C. |
| | 105-20° C. | 10° C./min | 5 min at 20° C. |
| $2^{nd}$ melting | 20-200° C. | 10° C./min | — |

The $2^{nd}$ melting curve can be used for calculation of the lamella thickness distribution according to Thomson-Gibbs equation:

$$T_m = T_0 \left(1 - \frac{2\sigma}{\Delta H_0 \cdot L}\right)$$

where $T_0=457$K, $\Delta H_0 = 184 \times 10^6$ J/m$^3$, $\sigma=0.049.6$ J/m$^2$ and L is the lamella thickness.

2. Materials

In Examples 1 to 11, polymer compositions according to the present invention were prepared. In Examples 1, 2, 4, 5, 7, 8 and 11, the polypropylene random copolymer was prepared first in a loop reactor, followed by preparation of the polypropylene homopolymer in a first gas phase reactor and preparation of the elastomeric copolymer in a second gas phase reactor. Ethylene was used as a comonomer for the random copolymer and the elastomer.

In Examples 3, 6, 9 and 10, the homopolymer was prepared first in a loop reactor, followed by preparation of the polypropylene random copolymer in a first gas phase reactor and preparation of the elastomeric copolymer in a second gas phase reactor. Ethylene was used as a comonomer for the random copolymer and the elastomer.

In the inventive examples 1-11, a Ziegler-Natta type catalyst was used which had been modified by transesterification and polymerization of a vinyl compound as described above.

Reference materials 1 to 7 are conventional impact-modified propylene polymers, comprising a polypropylene homopolymer matrix and an elastomeric copolymer dispersed therein. In particular, reference materials 1, 2, 3, 6 and 7 were prepared in a loop reactor, followed by a gas phase reactor and using a Ziegler-Natta catalyst including an electron donor. Reference materials 4 and 5 were produced in two loop reactors and one gas phase reactor. For reference materials 3, 5 and 6, a Ziegler-Natta type catalyst was used which had been modified by transesterification and polymerization of a vinyl compound as described above. Reference materials 1, 2, 3, 5, 6 and 7 comprise talc (less than 1 wt %) as a nucleating agent.

Reference materials 8 to 11 are impact-modified propylene polymers. These polymers have a matrix comprising a polypropylene homopolymer or, as an alternative, a polypropylene having less than 1 wt % ethylene units in combination with a polypropylene random copolymer. Reference materials 8 to 11 were prepared according to examples 10 to 13 of EP 0 894 103.

In Table 1, the reaction conditions for Examples 1 to 11 are summarized.

TABLE 1

| Summary of reaction conditions | | | | | | | | | | | |
|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Al/Ti ratio (mol/mol) | 200 | 200 | 200 | 200 | 200 | 200 | 200 | 200 | 200 | 200 | 200 |
| Al/donor ratio (mol/mol) | 5.0 | 5.0 | 5.0 | 5.0 | 5.0 | 5.0 | 5.0 | 5.0 | 5.2 | 5.2 | 5.2 |
| Loop: | | | | | | | | | | | |
| Temperature (° C.) | 80.0 | 80.0 | 80.0 | 80.0 | 70.0 | 80.0 | 80.0 | 80.0 | 80.0 | 80.0 | 80.0 |
| Split % | 54 | 53 | 48 | 54 | 50 | 49 | 56 | 56 | 52 | 52 | 40 |
| MFR2 (g/10 min) | 0.04 | 0.06 | 0.42 | 0.10 | 0.06 | 0.35 | 0.10 | 0.20 | 0.73 | 0.42 | 0.22 |
| XS/(%) | 3.6 | 3.4 | 1.9 | 3.4 | 6.4 | 1.5 | 3.4 | 3.4 | 1.8 | 1.8 | 5.1 |
| C2 content (%) | 2.1 | 1.9 | | 2.3 | 4.7 | | 2.2 | 2.2 | | | 2.8 |
| GPR1: | | | | | | | | | | | |
| Temperature (° C.) | 95 | 95 | 85 | 95 | 95 | 85 | 95 | 95 | 85 | 85 | 95 |
| Split % | 46 | 47 | 52 | 46 | 50 | 51 | 44 | 44 | 48 | 48 | 60 |
| MFR2 (g/10 min) | 0.2 | 0.3 | 0.3 | 0.5 | 0.3 | 0.3 | 0.5 | 0.9 | 0.7 | 0.3 | 3.4 |
| XS (%) | 2.2 | 2.1 | 2.1 | 2.2 | 3.4 | 3.3 | 2.2 | 2.2 | 2.2 | 2.2 | 3.6 |
| Ethene content (%) | 1.0 | 0.9 | 1.1 | 1.1 | 2.4 | 2.4 | 1.2 | 1.2 | 1.0 | 1.0 | 1.3 |

TABLE 1-continued

Summary of reaction conditions

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| GPR2: | | | | | | | | | | | |
| Temperature (° C.) | 70 | 60 | 60 | 60 | 60 | 60 | 60 | 60 | 60 | 60 | 60 |
| C2/C3 ratio (mol/kmol) | 434 | 580 | 643 | 617 | 546 | 653 | 608 | 608 | 645 | 645 | 546 |
| MFR2 (g/10 min) | 0.24 | 0.32 | 0.26 | 0.46 | 0.27 | 0.23 | 0.48 | 0.75 | 0.63 | 0.31 | 3.3 |
| XS (%) | 11.3 | 8.1 | 12.6 | 10.6 | 10.1 | 13.1 | 10.7 | 10.7 | 10.8 | 10.8 | 10.5 |
| ethene of AM | 32 | 35 | 34 | 36 | 41 | 32 | 36 | 35 | 37 | 37 | 41 |
| viscosity of AM (dl/g) | 3.2 | 3.5 | 3.3 | 3.4 | 3.4 | 2.9 | 3.3 | 3.3 | 3 | 3 | 2.4 |
| Ethene content (%) | 5.2 | 4.2 | 6 | 5.4 | 5.5 | 6.3 | 5.4 | 5.4 | 5 | 5 | 5.6 |
| Pellet MFR2 (g/10 min) | 0.26 | 0.35 | 0.32 | 0.47 | 0.27 | 0.28 | 0.44 | 0.75 | 0.63 | 0.3 | 3.2 |

In Tables 2-4, melt flow rate, tensile modulus, impact strength and resistance to slow crack growth are summarized for the inventive examples and the reference materials.

When compared to reference materials 1-7, the inventive materials have comparable or even better flowability (i.e. higher melt flow rate) and comparable stiffness (indicated by tensile modulus values) but have a resistance to slow crack growth which is several times higher. Thus, durability of the inventive compositions is very much improved.

When having a specific look at reference material 4, the conflicting behaviour of melt flow rate and durability is clearly evident. However, in inventive example 4 and in particular in inventive examples 8 and 11, the melt flow rate was increased but still results in materials of improved durability.

When compared to reference materials 8 to 11, the inventive materials have significantly higher tensile modulus and melt flow rate, thereby improving stiffness and processability.

From the SIST data, in particular when comparing Ex. 8 and Ref. 4, it can be seen that the present invention provides the advantage of flexibility with a low amount of the fraction with big lamellaes >17.6 nm (big lamellaes mean high stiffness) but still results in high stiffness.

TABLE 2

Homo-Random-Elastomer example materials

| | | Ex. 3 | Ex. 6 | Ex. 9 | Ex. 10 |
|---|---|---|---|---|---|
| MFR (1) | g/10 min | 0.31 | 0.3 | 0.63 | 0.3 |
| Melting peak $T_m$ (2) | ° C. | 162.3 | 161.8 | 162.5 | 163.7 |

TABLE 2-continued

Homo-Random-Elastomer example materials

| | | Ex. 3 | Ex. 6 | Ex. 9 | Ex. 10 |
|---|---|---|---|---|---|
| Crystallization temp. (2) | ° C. | 127.3 | 127.6 | 127.7 | 126.2 |
| Tensile modulus (3) | MPa | 1478 | 1271 | 1440 | 1562 |
| Stress at yield (3) | MPa | 28.4 | 26.2 | 28.3 | 28.8 |
| Strain at yield (3) | % | 6.8 | 8.4 | 6 | 6.5 |
| NIS, 23° C. (4) | KJ/m$^2$ | 64 | 60.3 | 61.5 | 61.3 |
| NIS, −20° C. (4) | KJ/m$^2$ | 3.8 | 3.6 | 3.8 | 3.7 |
| SCG, 80° C./4.2 MPa (5) | h | 1407 1685 | 4824 R | 624 R 624 R | 5880 R |
| Polydisp. index PI (6) | | 3.1 | 3.1 | 2.8 | 3.3 |

(1) ISO 1133, condition 230° C., 2.16 kg
(2) DSC, using a temperature increasing/decreasing rate of 10° C./min.
(3) ISO 527, speed 50 mm/min for stress at yield and strain at yield. For tensile modulus speed 1 mm/min.
(4) ISO 179/1eA;
(5) ISO 1167; (R = still running)
(6) Rheometer plate/plate, 220° C.

Mechanical tests from 4 mm compression moulded plaques, which were 3 weeks±2 days old when tested.

For additivation, a conventional system is used containing a lubricant, antioxidant and process stabilizer.

TABLE 3

Random-Homo-Elastomer example material

| | | Ex. 1 | Ex. 2 | Ex. 4 | Ex. 5 | Ex. 7 | Ex. 8 | Ex. 11 |
|---|---|---|---|---|---|---|---|---|
| MFR (1) | g/10 min | 0.24 | 0.31 | 0.46 | 0.32 | 0.44 | 0.75 | 3.3 |
| Melting peak $T_m$ (2) | ° C. | 159.5 | 159.5 | 158.8 | 155.6 | 159.1 | 158.9 | 158.1 |
| Crystallization temp. (2) | ° C. | 124.8 | 125.4 | 125.9 | 122.8 | 125.7 | 125.7 | 125.9 |
| Tensile modulus (3) | MPa | 1390 | 1563 | 1596 | 1233 | 1435 | 1465 | 1413 |
| Stress at yield (3) | MPa | 27.1 | 30.8 | 29.3 | 27.3 | 28.4 | 27.5 | 27.3 |
| Strain at yield (3) | % | 6.7 | 6.4 | 6.6 | 8.4 | 6.6 | 6.1 | 5 |
| NIS, 23° C. (4) | kJ/m$^2$ | 62.7 | 20.1 | 18.1 | 51.8 | 48.3 | 17.7 | 13.4 |

TABLE 3-continued

| | | \multicolumn{7}{c}{Random-Homo-Elastomer example material} |
| --- | --- | --- | --- | --- | --- | --- | --- | --- |
| | | Ex. 1 | Ex. 2 | Ex. 4 | Ex. 5 | Ex. 7 | Ex. 8 | Ex. 11 |
| NIS, −20° C. (4) | kJ/m$^2$ | 5.4 | 3 | 3.7 | 2.1 | 3.9 | 4.9 | 4.7 |
| SCG, 80° C./4.2 MPa (5) | h | 5544 R 6600 R | 5544 R 6600 R | 5328 R | 5544 R 6600 R | 4392 R 4632 R | 648 R 563 | 912 R 603 |
| Polydisp. index (6) | | 4.4 | 4.5 | 3.8 | 4.5 | 3.9 | 3.3 | |
| SIST/melt fraction of lamellar >17.6 nm (7) | % | | | | | | 5.9 | |

(1)-(6) have the same meaning as in Table 2.
(7) SIST, Stepwise Isothermal Segregation Technique Mechanical tests from 4 mm compression moulded plaques, which were 3 weeks±2 days old when tested.

For additivation, a conventional system is used containing a lubricant, antioxidant and process stabilizer.

TABLE 4

| | | \multicolumn{11}{c}{Reference materials - Properties} |
| --- | --- | --- | --- | --- | --- | --- | --- | --- | --- | --- | --- | --- |
| | | Ref. 1 | Ref. 2 | Ref. 3 | Ref. 4 | Ref. 5 | Ref. 6 | Ref. 7 | Ref. 8 | Ref. 9 | Ref. 10 | Ref. 11 |
| MFR (1) | g/10min | 0.28 | 0.28 | 0.3 | 0.8 | 0.27 | 0.35 | 1.3 | 0.13 | 0.14 | 0.19 | 0.16 |
| Melt. peak $T_m$ (2) | ° C. | 166 | 166.1 | 166.4 | 164.1 | 167 | 166 | 164.7 | 154.7 | 154.6 | 150.9 | 158 |
| Cryst. temp. (2) | ° C. | | 120.9 | | 117.7 | 129.5 | | | | | | |
| Tensile modulus (3) | MPa | 1409 | 1429 | 1528 | 1360 | 1826 | 1653 | 1495 | 940 | 860 | 860 | 880 |
| Stress at yield (3) | MPa | 25.5 | 25.6 | 25.2 | 24.9 | 28.5 | 24.2 | 24.8 | 23.3 | 21.3 | 21.7 | 20.5 |
| Strain at yield (3) | % | 5.5 | 5.4 | 5.2 | 5.2 | 4.1 | 4.4 | 3.3 | 9.8 | 9.2 | 10.5 | 7.5 |
| NIS, 23° C. (4) | kJ/m$^2$ | 63.2 | 65.5 | 68.6 | 54.2 | 31.5 | 48.2 | 48.3 | 53 | 69 | 66 | 56 |
| NIS, −20° C. (4) | kJ/m$^2$ | 6.1 | 6.3 | 5.9 | 4.7 | 4.2 | 6.4 | 5.7 | 2.3 | 3.7 | 3.4 | 5.2 |
| SCG, 80° C./4.2 MPa (5) | h | 132, 145, 386 | — | 159, 215 | 67, 95 | 499, 667 | 96, 103, 111 | 74 | | | | |
| Polydisp. index (6) | | 3.6 | 3.6 | 3.7 | 3.8 | 5.8 | 3.5 | 3.6 | | 6.1 | 7.4 | |
| SIST/melt fraction of lamellar >17.6 nm (7) | % | | 48.9 | | 3.2 | 39.7 | | | | | | |

(1)-(7) as defined above.

Mechanical tests from 4 mm compression moulded plaques, which were 3 weeks±2 days old when tested.

PI of Ref. 7, 9 and 10 was measured at a temperature of 200° C.

The invention claimed is:

1. A polymer composition, comprising
    (i) a polypropylene homopolymer having a melt flow rate $MFR_{2.16\ kg/230°\ C.}$ of less than 20 g/10 min,
    (ii) a polypropylene random copolymer, prepared by copolymerization of propylene with an olefin comonomer and having an amount of olefin comonomer units of 0.2 to 5.0 wt %, and
    (iii) an elastomeric copolymer of propylene and at least one olefin comonomer, comprising from 10 to 50 wt % olefin comonomer units based on the weight of the elastomeric copolymer,
    wherein the polymer composition has a tensile modulus, determined according to ISO 527-2/1 B at 1 mm/min. and 23° C., of at least 1400 MPa;
    wherein the polymer composition has a melting point of from 155.6° C. to less than 164° C.; and
    wherein the polypropylene homopolymer and the polypropylene random copolymer are blended during polymerization to result in a polypropylene-based matrix.

2. The polymer composition according to claim 1, wherein the weight average molecular weight of the polypropylene random copolymer is higher than the weight average molecular weight of the polypropylene homopolymer.

3. The polymer composition according to claim 1, wherein the olefin comonomer of the polypropylene random copolymer is selected from ethylene, $C_4$ to $C_{10}$ alpha-olefins, or mixtures thereof.

4. The polymer composition according to claim 3, wherein the olefin comonomer is ethylene.

5. The polymer composition according to claim 4, wherein the polypropylene random copolymer comprises an amount of 0.2 to 3.0 wt % of ethylene comonomer units.

6. The polymer composition according to claim 1, wherein the amount of olefin comonomer units within the polypropylene random copolymer is from 0.1 wt % to 3.0 wt %, based on the combined weight of the polypropylene homopolymer and the polypropylene random copolymer fraction.

7. The polymer composition according to claim 1, wherein the polypropylene-based matrix has a melt flow rate $MFR_{2.16\ kg/230°\ C.}$ within the range of 0.1 g/10 min. to 10.0 g/10 min.

8. The polymer composition according to claim 1, wherein the olefin comonomer of the elastomeric copolymer is selected from ethylene, $C_4$ to $C_{10}$ alpha-olefins, or mixtures thereof.

9. The polymer composition according to claim 8, wherein the olefin comonomer is ethylene.

10. The polymer composition according to claim 1, having a melt flow rate $MFR_{2.16\ kg/230°\ C.}$ and a resistance to slow crack growth which satisfy the following relationship:

$t \geq 300 - (200 * MFR_{2.16\ kg/230°\ C.})$ for $0.1$ g/10 min $\leq MFR_{2.16\ kg/230°\ C.} < 1.0$ g/10 min, $t \geq 105 - (5 * MFR_{2.16\ kg/230°\ C.})$ for $1.0$ g/10 min $\leq MFR_{2.16\ kg/230°\ C.} < 10.0$ g/10 min, $t \geq 55$ for $MFR_{2.16\ kg/230°\ C.} \geq 10.0$ g/10 min, wherein t in hours is the time of failure in the slow crack growth test performed at 80° C. and 4.2 MPa according to ISO 1167.

11. The polymer composition according to claim 1, having a melt flow rate $MFR_{2.16\ kg/230°\ C.}$ of at least 0.2 g/10 min.

12. The polymer composition according to claim 11, having a melt flow rate $MFR_{2.16\ kg/230°\ C.}$ of at least 0.2 g/10 min but less than 10.0 g/10 min.

13. The polymer composition according to claim 1, comprising the elastomeric copolymer in an amount of 5 to 15 wt %.

14. The polymer composition according to claim 1, having a Charpy impact strength of at least 2.0 $kJ/m^2$, measured according to ISO 179/1 eA at −20° C.

15. The polymer composition according to claim 14, wherein the tensile modulus is at least 1375 MPa and the Charpy impact strength at −20° C. is at least 3.0 $kJ/m^2$.

16. The polymer composition according to claim 1, further comprising a nucleating agent selected from talc, polymerized vinyl compounds, dibenzylidene sorbitol, sodium benzoate, di(alkylbenzylidene)sorbitol, or mixtures thereof.

17. The polymer composition according to claim 16, wherein the nucleating agent is a polymerized vinyl compound.

18. The polymer composition according to claim 1, wherein the polymer composition has a polydispersion index from 2.5 to 6.0.

19. A polymer composition, consisting of:
(i) a polypropylene homopolymer having a melt flow rate $MFR_{2.16\ kg/230°\ C.}$ of less than 20 g/10 min,
(ii) a polypropylene random copolymer, prepared by copolymerization of propylene with an olefin comonomer and having an amount of olefin comonomer units of 0.2 to 5.0 wt %, and
(iii) an elastomeric copolymer of propylene and at least one olefin comonomer, comprising from 10 to 50 wt % olefin comonomer units based on the weight of the elastomeric copolymer,
wherein the polymer composition has a tensile modulus, determined according to ISO 527-2/1 B at 1 mm/min. and 23° C., of at least 1400 MPa; and
wherein the polymer composition has a melting point from greater than 157° C. to less than 164° C.

* * * * *

UNITED STATES PATENT AND TRADEMARK OFFICE
CERTIFICATE OF CORRECTION

PATENT NO.        : 8,557,920 B2                                              Page 1 of 1
APPLICATION NO. : 11/914886
DATED             : October 15, 2013
INVENTOR(S)       : Alastalo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this
Fifteenth Day of September, 2015

Michelle K. Lee
*Director of the United States Patent and Trademark Office*